(12) United States Patent
Anderson (10) Patent No.: US 9,228,542 B2
(45) Date of Patent: Jan. 5, 2016

(54) SWIRL VANE AIR DUCT CUFF ASSEMBLY AND METHOD OF MANUFACTURE

(71) Applicant: STEERE ENTERPRISES, INC., Tallmadge, OH (US)

(72) Inventor: Eric D. Anderson, Uniontown, OH (US)

(73) Assignee: STEERE ENTERPRISES, INC., Tallmadge, OH (US)

( * ) Notice: Subject to any disclaimer, the term of this patent is extended or adjusted under 35 U.S.C. 154(b) by 0 days.

(21) Appl. No.: 14/280,800

(22) Filed: May 19, 2014

(65) Prior Publication Data

US 2014/0338781 A1 Nov. 20, 2014

Related U.S. Application Data

(60) Provisional application No. 61/825,155, filed on May 20, 2013.

(51) Int. Cl.
*F15D 1/02* (2006.01)
*F02M 29/06* (2006.01)
*F02M 35/10* (2006.01)

(52) U.S. Cl.
CPC ......... *F02M 29/06* (2013.01); *F02M 35/10262* (2013.01); *F02M 35/10321* (2013.01); *F02M 35/10347* (2013.01); *Y02T 10/146* (2013.01)

(58) Field of Classification Search
CPC ...... F15D 1/0005; F15D 1/0015; F15D 1/009
USPC .......................................................... 138/38, 39
See application file for complete search history.

(56) References Cited

U.S. PATENT DOCUMENTS

| | | | |
|---|---|---|---|
| 3,904,347 A * | 9/1975 | Rokudo et al. ................... 431/1 |
| 4,695,225 A * | 9/1987 | Hellat et al. ................. 415/189 |
| 5,197,509 A * | 3/1993 | Cheng ............................. 137/13 |
| 5,529,084 A * | 6/1996 | Mutsakis et al. ............... 137/13 |
| 5,529,743 A | 6/1996 | Powell ........................... 264/513 |
| 5,682,924 A | 11/1997 | Powell ........................... 138/109 |
| 5,992,465 A * | 11/1999 | Jansen ............................ 138/37 |
| 6,041,824 A | 3/2000 | Powell ........................... 138/109 |
| 6,110,412 A | 8/2000 | Anderson ...................... 264/504 |
| 7,267,098 B1 * | 9/2007 | Tasanont et al. .............. 123/306 |
| 7,444,814 B2 | 11/2008 | Sumser ............................ 60/601 |
| 7,665,442 B1 * | 2/2010 | Levitz et al. ................... 123/306 |
| 8,322,381 B1 * | 12/2012 | Glanville et al. .............. 138/39 |
| 2003/0072214 A1* | 4/2003 | Fleischli et al. ........... 366/175.2 |
| 2005/0039809 A1* | 2/2005 | Speldrich ........................ 138/39 |
| 2008/0060712 A1* | 3/2008 | Gluzman et al. ............... 138/39 |
| 2008/0210325 A1* | 9/2008 | Aroussi .......................... 138/39 |
| 2009/0050105 A1* | 2/2009 | Shibata et al. ............... 123/306 |
| 2011/0114070 A1 | 5/2011 | Liu et al. ...................... 123/590 |
| 2012/0222764 A1 | 9/2012 | Hermann et al. ............. 137/808 |
| 2013/0153074 A1* | 6/2013 | Gurr et al. ...................... 138/39 |

* cited by examiner

*Primary Examiner* — James Hook
(74) *Attorney, Agent, or Firm* — Renner Kenner Greive Bobak Taylor & Weber

(57) ABSTRACT

A swirl vane air duct cuff assembly includes a tubular body and a swirl vane cuff extending from the tubular body. The swirl vane cuff has an exterior surface which has a cuff groove, and an interior surface which has at least one inward radially extending vane.

13 Claims, 11 Drawing Sheets

SWIRL VANE AIR DUCT CUFF ASSEMBLY AND METHOD OF MANUFACTURE

CROSS-REFERENCE TO RELATED APPLICATIONS

This application claims priority of U.S. Provisional Application Ser. No. 61/825,155 filed May 20, 2013, which is incorporated herein by reference.

TECHNICAL FIELD

The present invention relates in general to an automotive clean air duct used to interconnect an automobile engine throttle body or turbo charger to an air filter. More particularly, the present invention relates to a clean air duct with a cuff that is positioned on a receiving port, wherein the cuff has inwardly directed radial vanes. Specifically, the cuff includes inwardly directed radial vanes which are angularly oriented so as to generate a swirling air flow as air passes therethrough. Related methods of manufacture are also disclosed.

BACKGROUND ART

Air ducts of various lengths and sizes are used to transfer clean, filtered air from an air filter through an engine air intake system. It is also well known to use air ducts to transfer cooled or heated air from within the engine compartment to the passenger compartment of an automobile. Air ducts are widely used in other applications wherever air or any other gas-like substance is transferred between components.

Air ducts have been formed by using a rubber molding process. Although the rubber molded air ducts are effective, they are considered too heavy for use in vehicles requiring lighter weight to improve fuel efficiency. Additionally, rubber molded air ducts are bulky and difficult to mold in the serpentine configurations desired for automobiles which have limited space in the engine compartment.

An alternative to using a one-piece rubber molded air duct is a two-piece construction which utilizes a thermoplastic blow molded tubular body with an injection molded rubber cuff, sometimes called a seal, affixed to an end thereof. Although lighter and more compact than a rubber air duct, the two-piece construction has its own inherent problems. The tubular body must be mechanically secured or adhesively bonded to the cuff to affect a connection therebetween that can withstand the vibration and heat within an engine compartment.

Seals or cuffs are typically made of a very soft elastomeric polymer material. The cuffs are attached to a connection port in many ways including, but not limited to, thermoplastic welding, worm-gear clamping, or overmolding. Overmolding is the most robust process for forming the cuff because it creates a uniform melt bond to the hard polymer duct.

In a specific application, air ducts are used to supply air and/or exhaust gases to a turbocharger. In such applications, it has been determined that introducing a swirling motion to the air or gases, which are fed to the turbocharger, improves the efficiency thereof. Introduction of the swirling motion can be achieved by incorporating vanes into the air duct. However, depending upon the placement of the vanes in the duct the swirling motion may be minimized or lost. It is also known to use swirl vane rings that are separately injection molded and snap-fit into the air duct. However, these rings tend to rattle and/or fall out during assembly or shipping and may also become dislodged during use, thus minimizing the effectiveness of the turbocharger.

Therefore, there is a need in the art for a swirl vane cuff that creates a desired air flow pattern but which also provides a standard cuff clamp seal. There is also a need for a swirl vane cuff that is overmolded directly to the air duct and which creates a leak-proof chemical bond between the two.

DISCLOSURE OF THE INVENTION

It is therefore an object of the present invention to provide a swirl vane air duct cuff assembly and method of manufacture.

It is another object of the present invention to provide a swirl vane air duct cuff assembly comprising a tubular body and a swirl vane cuff extending from the tubular body, the swirl vane cuff having an exterior surface which has a cuff groove, and an interior surface which has at least one inward radially extending vane.

BRIEF DESCRIPTION OF THE DRAWINGS

These and other features and advantages of the present invention will become better understood with regard to the following description, appended claims, and accompanying drawings. Further, in the accompanying drawings and description that follow, like parts are indicated throughout the drawings and written description with the same reference numerals, respectively. The figures may or may not be drawn to scale and proportions of certain parts may be exaggerated for convenience of illustration.

BEST MODE FOR CARRYING OUT THE INVENTION

Figure 1:
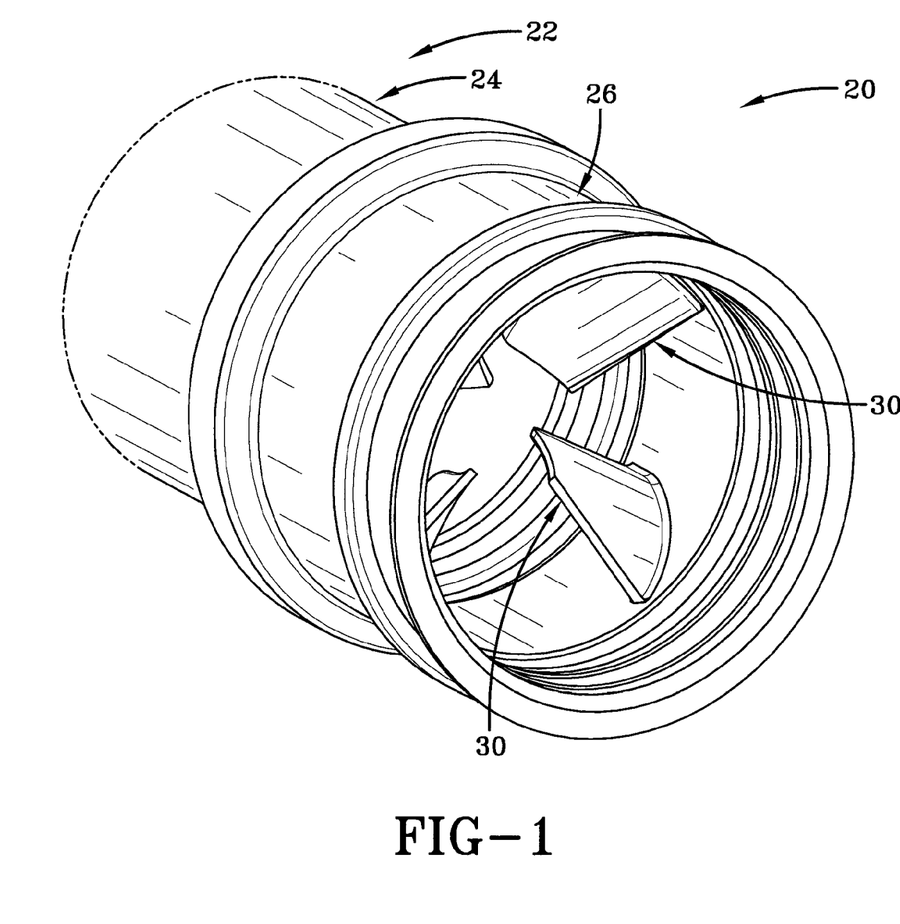
FIG. 1 is a perspective view of a swirl vane air duct cuff assembly made in accordance with the concepts of the present invention.
Figure 2:
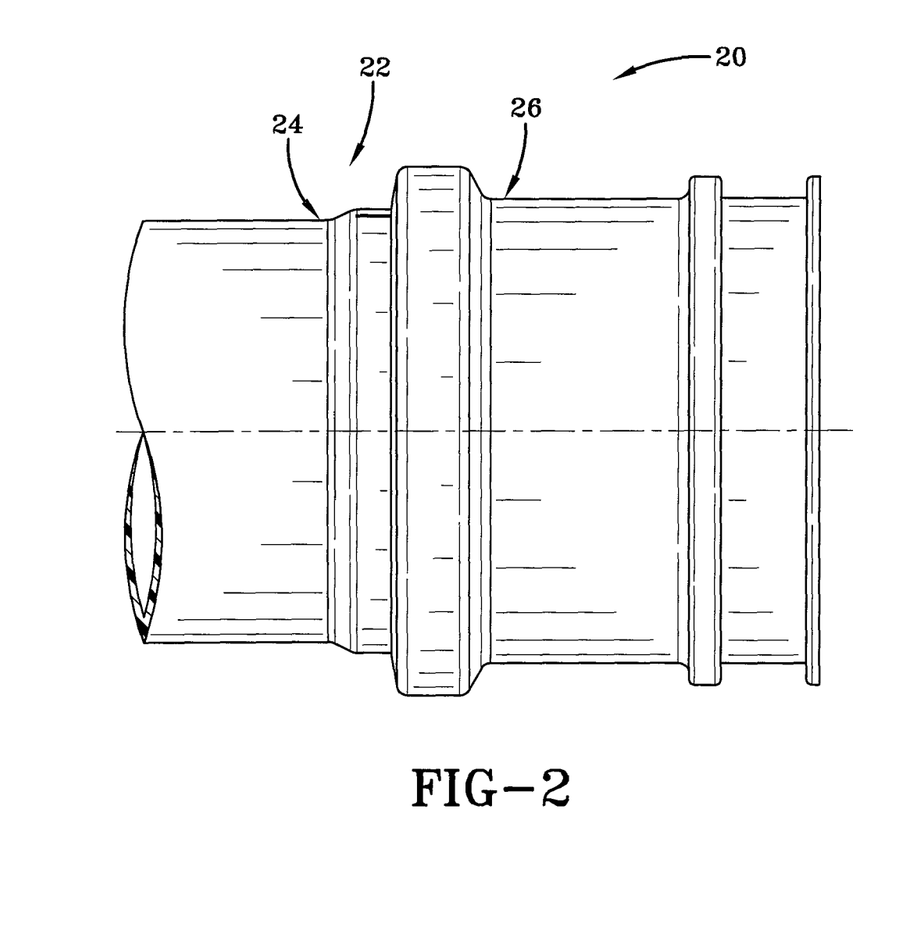
FIG. 2 is a top view of the assembly according to the concepts of the present invention.

With reference to the drawings, and in particular to FIGS. 1 and 2, it can be seen that a swirl vane air duct cuff assembly is designated generally by the numeral 20. The assembly 20 is receivable and/or mounted to a port such as an air filter, another air duct, an engine compartment, a throttle body, a turbocharger, or other similar structure. The assembly disclosed herein is used in automobile engine compartments and skilled artisans will appreciate that the duct and associated cuff assembly disclosed herein may be utilized in any environment where air or gas needs to be transferred from one compartment to another and in such a way so as to impart a swirling motion to the airflow.

Generally, the air duct 22 comprises a tubular body 24. The tubular body may be straight, contoured, angled, provided with pleats so as to allow flexibility of the body, or provided with any number of associated inputs and output ports. It will further be appreciated that the body does not need to be tubular, but can be any appropriately configured shape to facilitate manufacturing. It is believed that a tubular configuration, which can be constructed by blow molding or injection molding, will be the most effective construction. Connected or mounted to at least one end of the tubular body 24 is a swirl vane cuff designated generally by the numeral 26. The swirl vane cuff provides at least one and in most embodiments a plurality of swirl vanes 30 which are inward and radially extending. As will become apparent as the detailed description proceeds, the swirl vane air duct cuff assembly provides for internal swirl vanes which facilitate the air flow through the duct and which position the swirl vanes in close proximity to the receiving port. The disclosed construction is formed utilizing an over molding process which in most embodiments is an injection-type molding process. But it will be appreciated that other molding processes could be employed. Moreover, other construction processes could be employed wherein the parts are separately formed and are secured to one another by other means. In any event, overmolding is believed to be the most robust way to attach the cuff to an end of the air duct and also for forming the swirl vanes in a cost-efficient manner.

Figure 3:
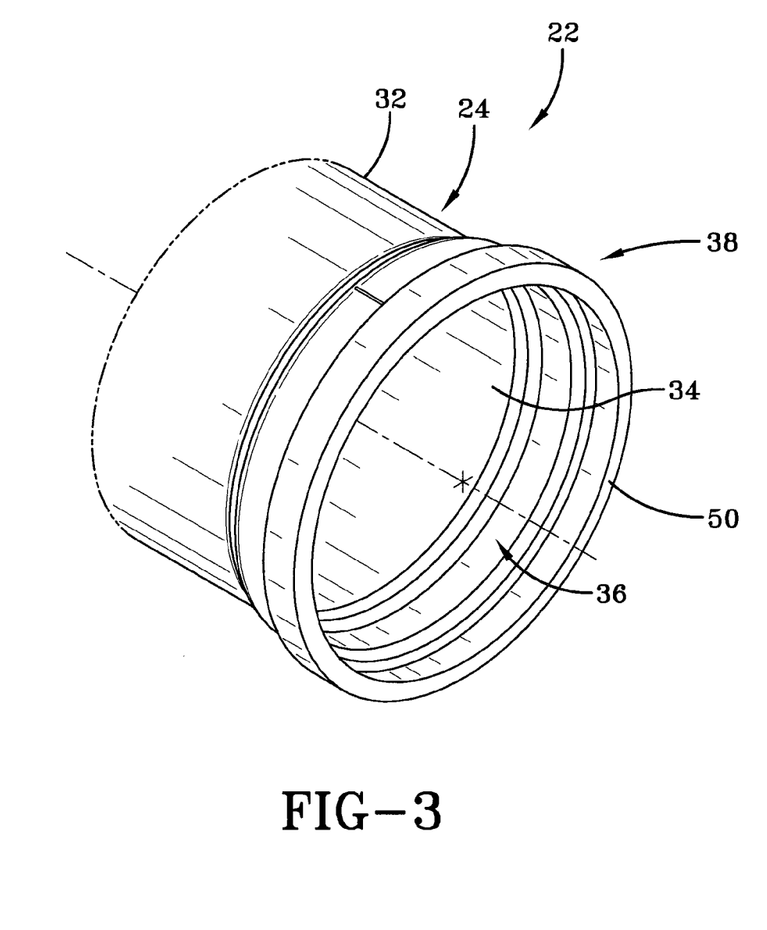
FIG. 3 is a perspective view of an air duct used in the assembly according to the concepts of the present invention.
Figure 4:
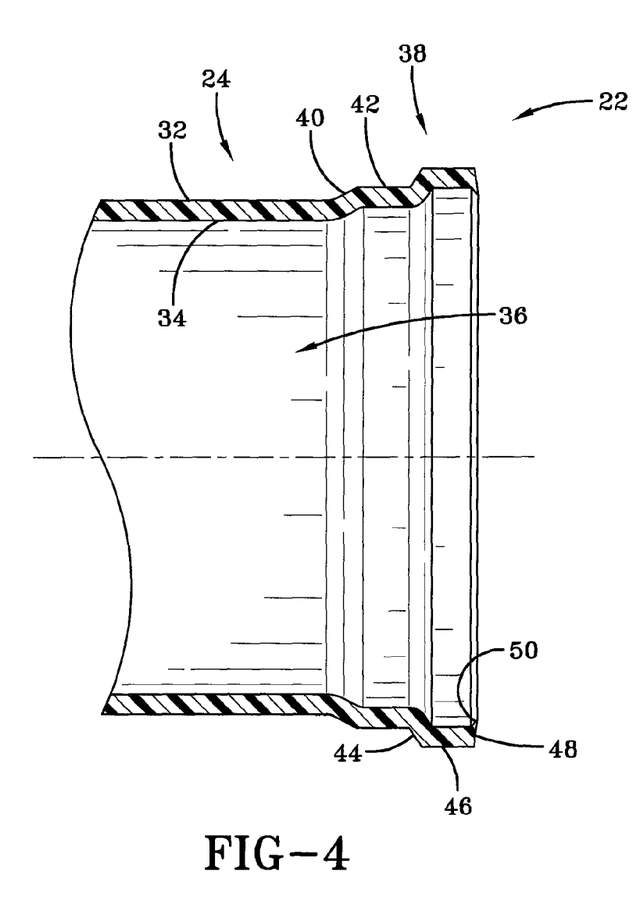
FIG. 4 is a partial cross-sectional view of the air duct used in the assembly according to the concepts of the present invention.
Figure 5:
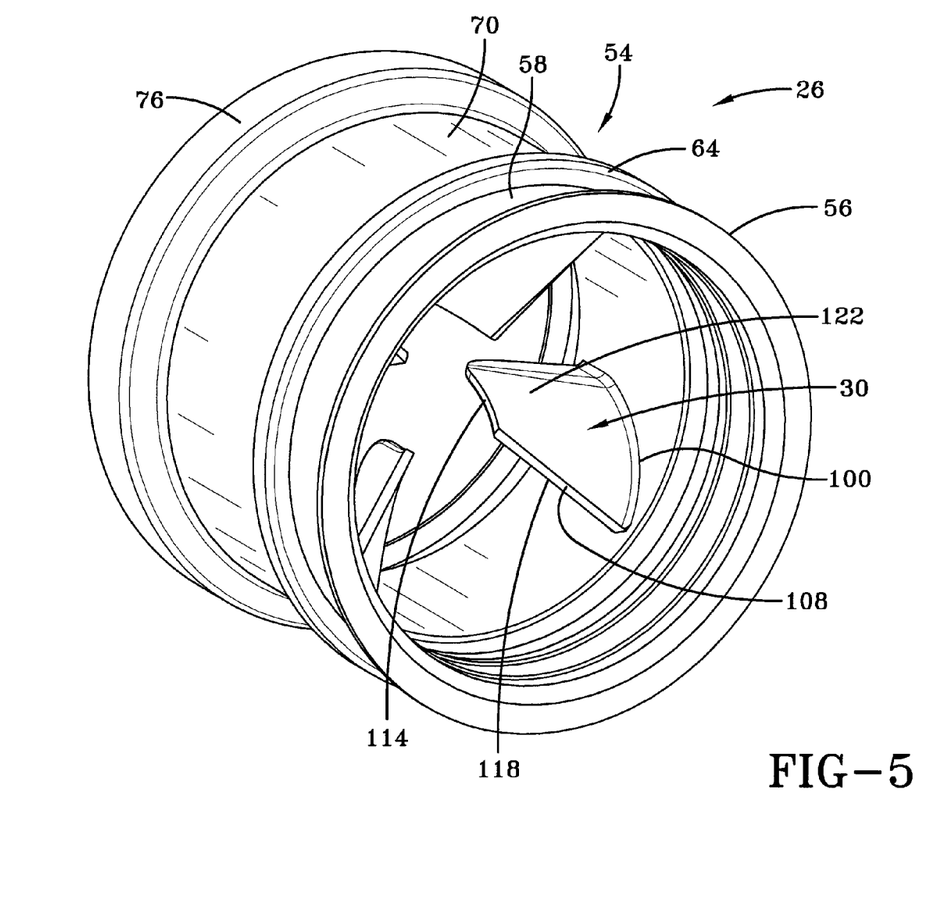
FIG. 5 is a perspective view of a swirl vane cuff used in the assembly according to the concepts of the present invention.
Figure 6:
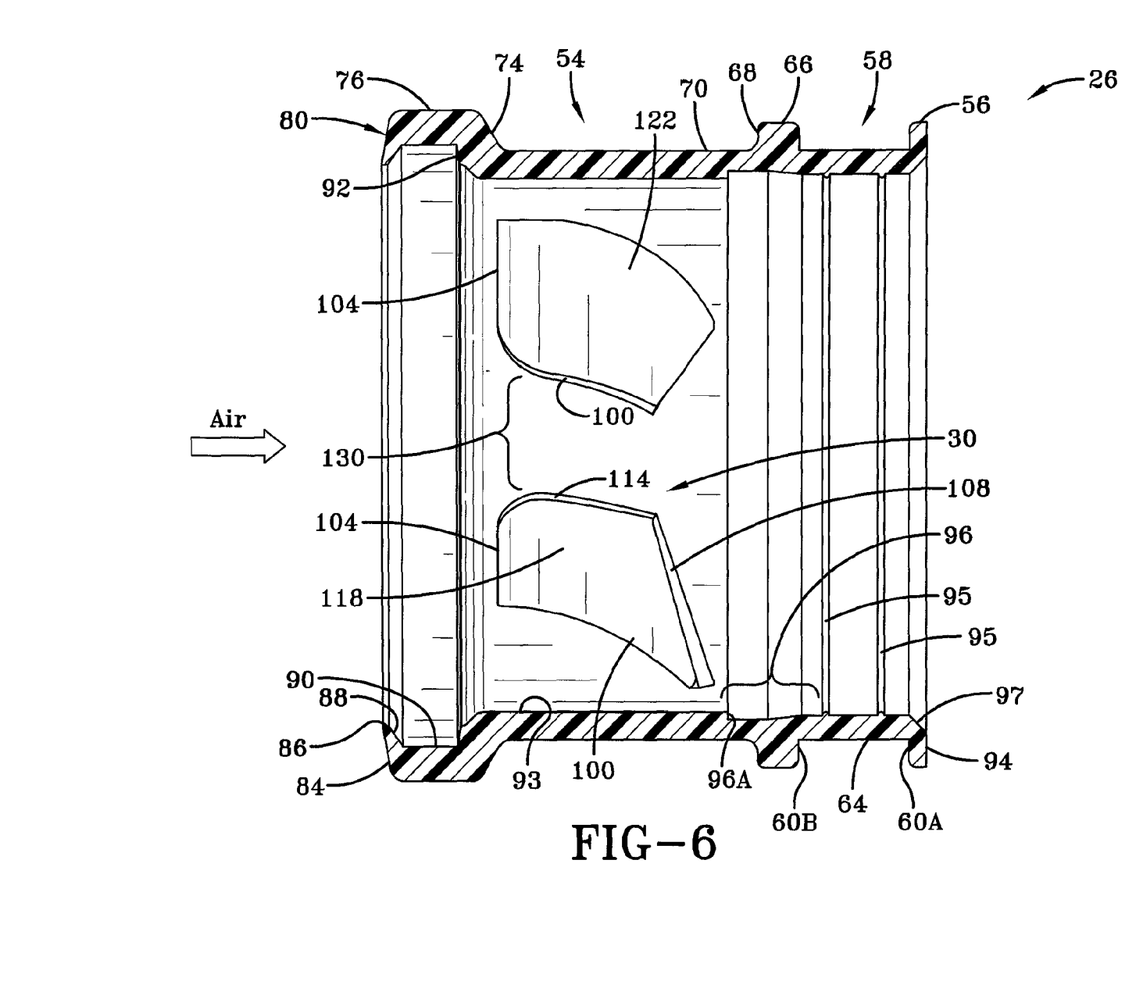
FIG. 6 is a cross-sectional view of the swirl vane cuff according to the concepts of the present invention.

Referring now to FIGS. 3 and 4 the details of the tubular body will be discussed. The tubular body 24 provides an exterior surface 32 which is opposite an interior surface 34. The interior surface 34 provides for a hollow body interior 36 through which airflow is directed through the tubular body 24. The surfaces 32 and 34 are terminated at and connected to one another at a cuff end 38. The cuff end 38, in most embodiments, provides for a transition between the tubular body and the swirl vane cuff 26. In particular, the cuff end 38 includes a step 40 which angularly extends from the tubular body. Extending from the step 40 is a transition sleeve 42, which in most embodiments is concentric with the exterior surface 32 and of a slightly larger outer diameter. Angularly extending from the transition sleeve 42 is an annular shoulder 44 from which extends an annular ring 46. Skilled artisans will appreciate that in most embodiments the annular ring 46, the transition sleeve 42 and the tubular body 24 are concentric with one another but that each has a different diameter. However, in other embodiments this may not be required. In any event, extending from the annular ring 46 is an inwardly extending lip 48 which provides for a lip surface 50. The cuff end 38 is adopted from and disclosed in U.S. Pat. No. 5,682,124, which is incorporated herein by reference. As disclosed therein, the cuff end configuration is suitable for providing a sealing surface so as to facilitate the formation of an overmolded cuff, such as will be described, onto the tubular body. In some embodiments, the cuff end 38 may be provided as a simple termination without any diameter changes or the cuff end may provide only an annularly extending rib.

The tubular body 24, in most embodiments, is manufactured utilizing a blow-molding process. In some embodiments, the body may be manufactured by extrusion or injection molding. The tubular body may be made from a polymeric material such as polypropylene manufactured by Lyondell Bassel under port number Pro-Fax™ SV152 which has a hardness value of 78 Shore D. Skilled artisans will appreciate that other polymeric materials having similar properties and values may also be utilized. Other suitable materials that could be used for the tubular body 24 are: nylon manufactured by BASF under the part number Ultrmid™ 8272G which has a hardness value of 121 Shore R; nylon 6/6 manufactured by DuPont under part number Zytel™ BM70G20HSLX which has a hardness value of 120 Shore R; or thermoplastic elastomer manufactured by Teknor Apex under part number Sarlink™ 4190B which has a hardness value of 90 Shore A. Accordingly, in some embodiments the material used for the tubular body 24 may have a hardness value ranging anywhere from about 70 Shore A to about 130 Shore R, and in other embodiments from about 90 Shore A to about 121 Shore R.

Referring now to FIGS. 5-8, it can be seen that the swirl vane cuff 26 includes a cuff body 54. The swirl vane cuff body is constructed of a polymeric material and, in particular a polymeric material which, in most embodiments, is relatively softer than the polymeric material utilized for the tubular body. The cuff 26 may be made from thermoplastic elastomer which is manufactured by RTP Company under part number RTP™ 6091-65 which has a hardness value of 65 Shore A. Other polymeric materials having similar properties and values may be utilized. Other suitable materials that could be used for the internal cuff are: thermoplastic elastomers manufactured by Exxon Mobile part number Satoprene™ 101-55, which has a hardness value of 55 Shore A, or Santoprene™ 101-64 which has a hardness value of 64 Shore A. Other suitable thermoplastic elastomers are manufactured by Teknor Apex under part numbers Sarlink 4175B, which has a hardness value of 75 Shore A, or Sarlink 4180B which has a hardness value of 80 Shore A. The RTP Company also manufactures thermoplastic elastomers RTP™ 6091-65, which has a hardness value of 65 Shore A, and RTP 6091-85, which has a hardness value of 85 Shore A. A liquid silicone rubber material manufactured by Wacker Chemical under part number LR 3070/60 which has a hardness value of 60 Shore A may also be utilized. Accordingly, in some embodiments, the material used for the internal cuff may have a hardness value ranging anywhere from about 45 Shore A to about 90 Shore A, and in other embodiments from about 55 Shore A to about 80 Shore A.

The cuff body 54 provides for a cuff rim 56 at one end of the body. The rim 56 is the end typically mounted to a receiving port as will be discussed. The cuff rim 56 includes or is adjacent to a cuff groove designated generally by the numeral 58. The cuff groove 58 is formed by opposed sidewalls 60A and 60B which are connected to one another by a cuff surface 64. The outer diameter of the cuff surface is sized such as to receive a clamp (not shown) so as to secure the cuff to a receiving duct or port. Adjacent the cuff groove 58 and extending substantially perpendicular from the sidewall 60B is a collar 66. Extending substantially perpendicularly from the cuff collar 66 is a collar sidewall 68 from which extends a cuff sleeve 70. At an end of the cuff sleeve 70 opposite the collar sidewall 68 is a cuff ramp 74 which angularly extends from the sleeve 70. A cuff ring 76 extends from the end of the cuff ramp 74 opposite the sleeve 70 and the cuff ring 76 is terminated at a cuff finger 80.

The cuff finger 80 includes a finger edge 84 which ends at a finger tip 86. The finger tip 86 is at the opposite end of the cuff rim 56. Angularly extending from the tip 86 is a finger rim 88 which is part of the cuff body's interior surface. Extending from the finger rim is an internal ring surface 90. The ring surface 90 provides for a lip surface 92 which, as will be seen, abuts the lip surface 50 provided by the tubular body 24. Extending from the lip surface 92 is an internal cuff surface 93 which extends to the end surface 94 which is substantially perpendicular to the rim 56. The internal cuff surface 93 provides for at least one internal rib 95 which is opposite the exterior facing cuff surface 64. In between the at least one internal rib 95 and the lip surface 92 are a plurality of duct edges 96 which conform to the receiving duct. Indeed, the edges 96 include a stop surface 96A. In between the end surface 94 and the internal cuff surface 93 is a cuff chamfer 97 which is an angular transition so as to facilitate mounting of the cuff onto an appropriate duct.

Figure 7:
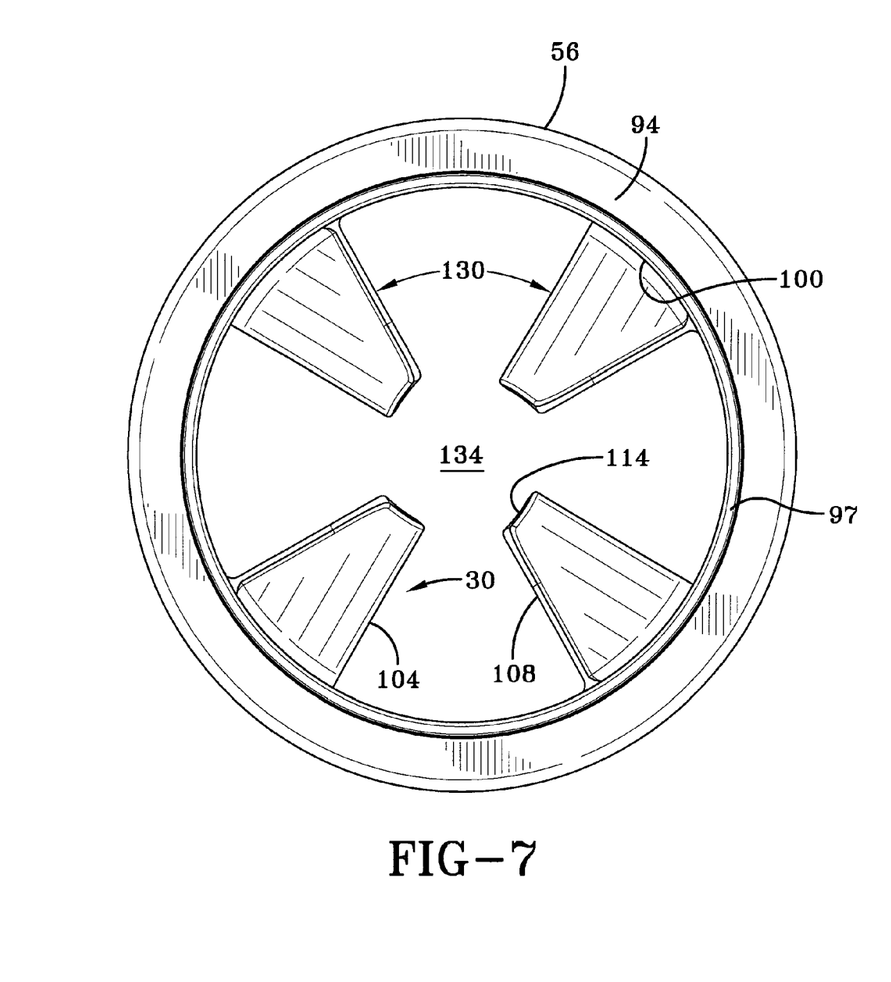
FIG. 7 is a front elevational view of the swirl vane cuff according to the concepts of the present invention.
Figure 8:
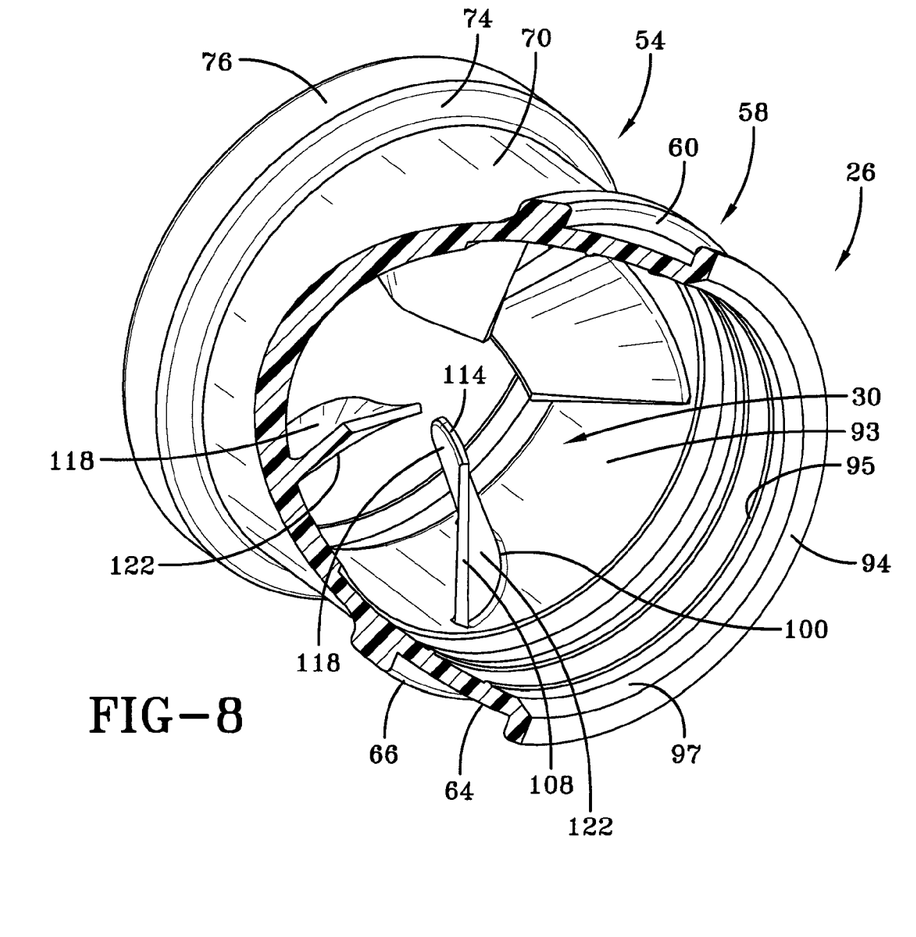
FIG. 8 is a perspective view, in partial cross-section, of the swirl vane cuff used in the assembly according to the concepts of the present invention.

The swirl vanes 30, which extend from the cuff body's interior surface, each have a base 100 that is connected to and extends from the internal cuff surface 93. In one embodiment, if a plurality of vanes are provided, they may be positioned about the internal cuff surface in substantially equal angular increments. If desired, other spacing of the vanes at other angular increments may be employed. Although four vanes are shown, it will be appreciated that any number of vanes may be provided that impart a swirling air motion to air that enters from the tubular body and exits at the opposite end of the cuff. Each vane is connected to the internal cuff surface by a base 100. Extending from one side of the base 100 is a leading edge 104 which may or may not be tapered. Opposite the leading edge 104 and extending from an opposite side of the base 100 is a trailing edge 108 which also may or may not be tapered. The leading edge 104 and trailing edge 108 are connected to one another at a tip 114. As shown, the tip may be somewhat truncated or it may extend to a point. Each vane provides for an airflow surface 118 upon which the air entering the cuff is impacted upon. Each vane also provides a back surface 122 which is essentially on a side opposite the airflow surface 118. Between the adjacent vanes and in particular between a leading edge of one vane and a trailing edge of an adjacent vane is a vane gap 130. Collectively, the tips of the vanes form an open space and in particular an axial flow path designated generally by the numeral 134. As best seen in FIGS. 7 and 8, it can be seen that each vane is shaped in a contoured manner. In other words, the leading edge initially extends somewhat perpendicularly into the incoming air flow and then the airflow surface 118 guides the airflow along the airflow surface of the vane, from the leading edge to the trailing edge, so as to impart a swirling motion. With all the vanes acting together, the airflow transitions from a generally axial flow to airflow with a counter-clockwise rotation. In other words, the airflow transitions from an axial direction to a swirling direction which assists in increasing the airflow and imparting to the airflow a quality that is suitable for receipt by a turbocharger or other device. Skilled artisans will appreciate that the shape of the vanes may be configured to impart a clockwise rotation as the airflow passes through the cuff.

Figure 9:
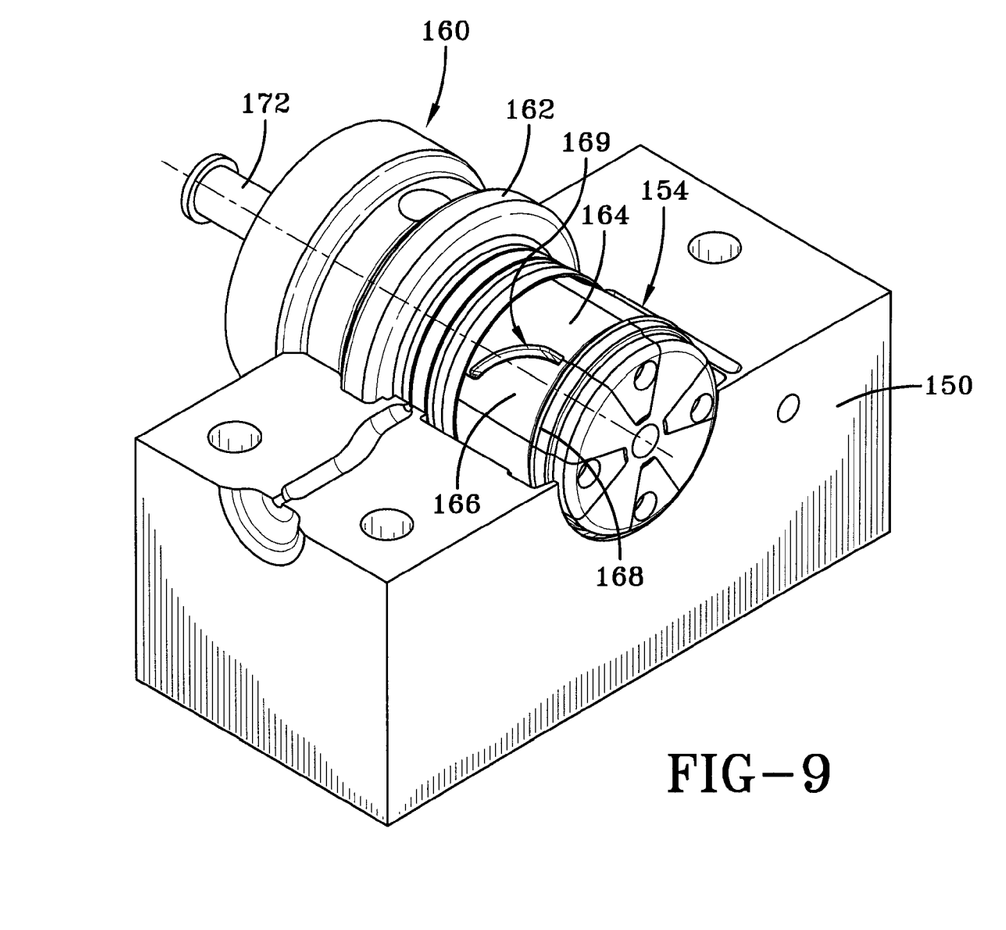
FIG. 9 is a perspective view of a mold utilized in formation of the swirl vane air duct cuff assembly according to the concepts of the present invention.
Figure 10:
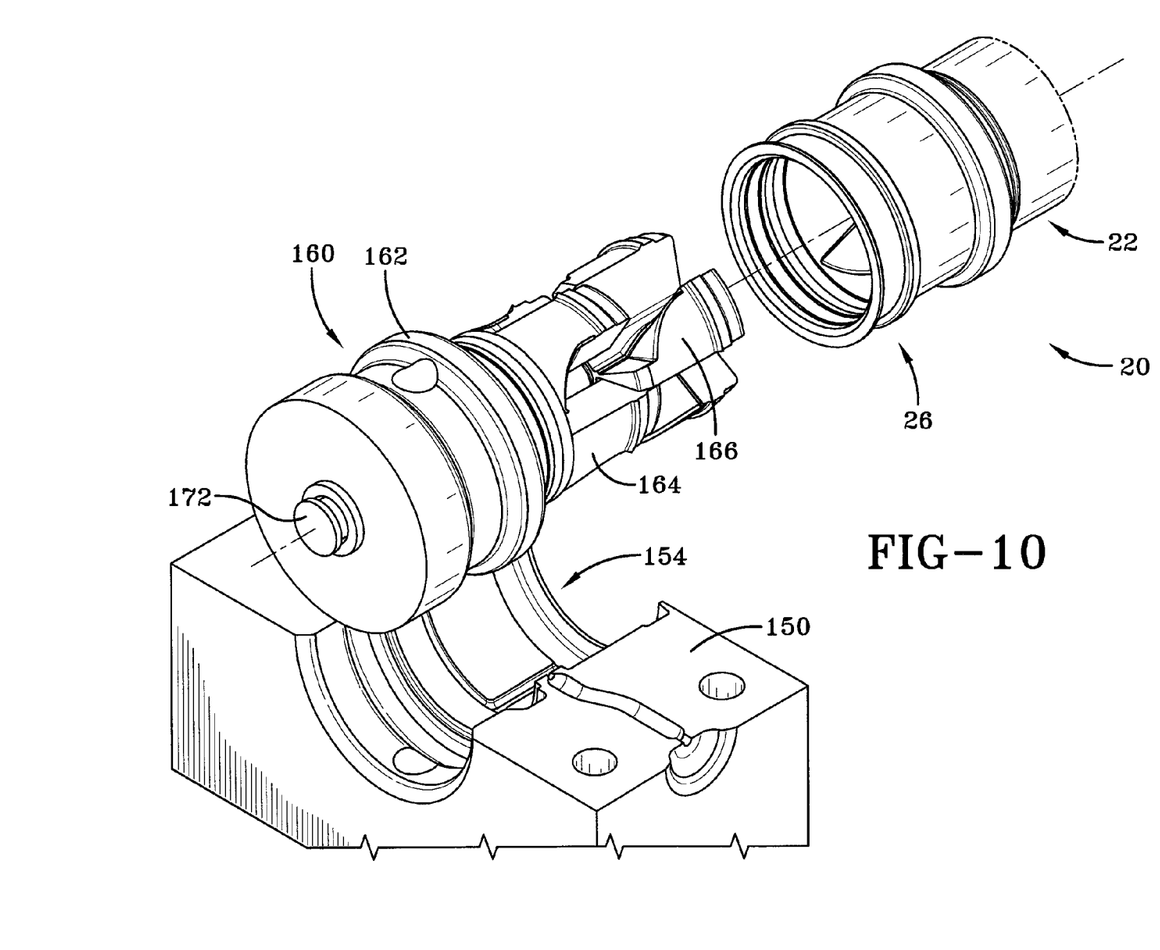
FIG. 10 is an exploded view of the mold utilized to make the swirl vane air duct cuff assembly with removal of the completed assembly from the mold.

Referring now to FIGS. 9 and 10, it can be seen how the swirl vane cuff is formed and secured to the tubular body. In particular, FIG. 9 shows a mold half 150 wherein the mold half not shown is substantially similar thereto but not shown for clarity purposes. In any event, the mold half 150 provides for a mold cavity 154 which forms the external surfaces of the swirl vane cuff 26. A core assembly 160 is received in the mold cavity 154 and seals around the tubular body and also forms the internal surfaces of the swirl vane cuff. The core assembly 160 provides for a main core 162 which forms the cuff area of the swirl vane cuff. Extending from the vane core 162 is a fixed vane core 164 and a movable vane core 166. The fixed vane core 164 and the movable vane core 166 are interleaved with one another. Together, the cores 164 and 166 provide an annular edge ring 168. Spaces 169 are provided between adjacent sides of the cores 162 and 164, wherein the spaces form the vanes 30. A plunger 172 extends through the main core 162 for connection to the movable vane core 166. Axial movement of the plunger 172 results in axial movement of the movable vane core 166 with respect to the fixed vane core 164. Skilled artisans will appreciate that the tubular body 24 is mounted onto the core assembly 160. In particular, the end of the tubular body is fit onto the main core 162 such that the inwardly extending lip 48 and the lip surface 50 abut the edge ring 168. When both mold halves are enclosed over the tubular body and the core assembly, the mold seals around the exterior surface 32 so that the molding material received in the cavity properly forms around the tubular body. After the molten polymer fills the spaces 169 in the main core assembly and the mold cavity 154 and bonds to the tubular body, the mold halves are opened. Next, the main core assembly is lifted out of the mold cavity. Next, a manual or an automated assembly is utilized to exert an axial force on the plunger 172 as best seen in FIG. 10. Movement of the plunger 172 in this manner moves the movable vane core 166 axially so as to dislodge the molded swirl vane cuff and the tubular body assembly. Next, the operator of the system will rotate the molded assembly so as to release the swirl vanes from the mold and remove the assembled part from the core assembly 160.

Figure 11:
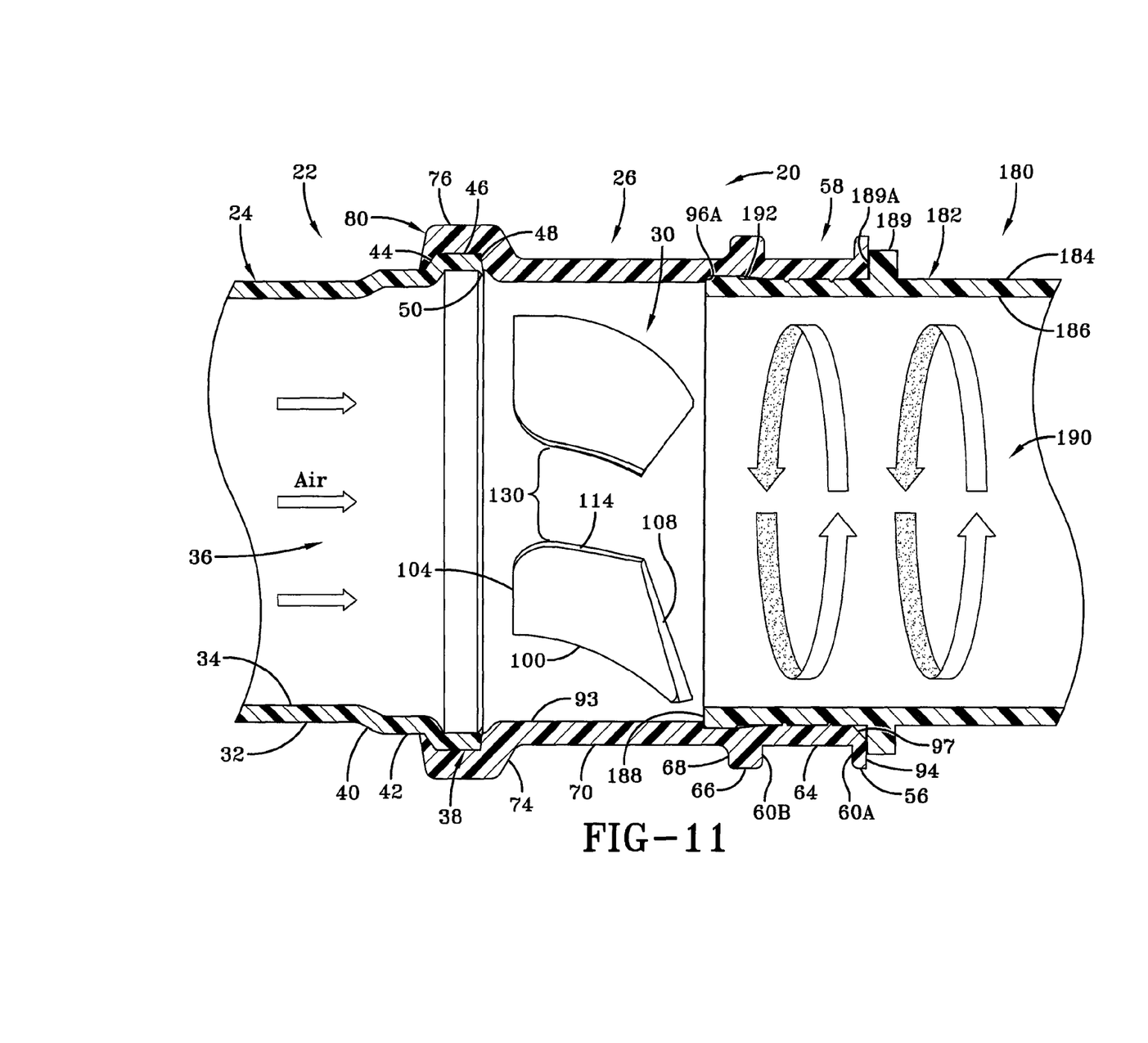
FIG. 11 is a cross-sectional view of the swirl vane air duct cuff assembly made according to the concepts of the present invention.

Referring now to FIG. 11, it can be seen that the completed swirl vane air duct cuff assembly is mounted onto a receiving port 180. The receiving port 180 includes a tubular body 182 which has an exterior surface 184 opposite an interior surface 186. The surfaces 184 and 186 are connected to one another at an end 188. An annular rib 189 having a rib surface 189A may radially extend from the exterior surface 184. The annular rib 189 may be somewhat removed from the end 188. The tubular body 182 includes an opening 190 which is aligned with the body interior 36 of the tubular body 24 and the axial path 134 formed by the swirl vane cuff. A cuff facing surface 192 is provided between the rib surface 189A and the end 188. As shown, the cuff 26 is received on the receiving port 180 and the end 188 of the tubular body 182 is generally aligned with the duct edges 96 and, in particular, a stop surface 96A. And, if provided, the rib surface 189A functions to prevent the cuff from extending too far on the receiving port by abutting the end surface 94. Moreover, it will be appreciated that the internal ribs 95 of the swirl vane cuff are disposed onto the cuff facing surface 192. This allows for a clamp ring or other clamping device to be disposed in the cuff groove 58 for securing the completed assembly to the receiving port 180.

This view also shows the interrelationship between the cuff end 38 and the cuff ring 76. In particular, it can be seen that the inwardly extending lip 48 is adjacent to and may form the lip surface 92 of the swirl vane cuff. The cuff finger 80 encloses around and bonds to the cuff end 38 and in particular the annular shoulder 44 so as to provide a secure bond and connection between the swirl vane cuff and the tubular body. FIG. 11 also shows the positioning of the swirl vanes within the completed assembly and how the swirl vanes impart a swirling airflow to the axial airflow within the cuff area.

Based on the foregoing, the advantages of the present construction are readily apparent. The assembly 20 provides for a comparatively rigid tubular body and a cuff, which has a material softer than that utilized in the tubular body. However, in some embodiments it will be appreciated that an equivalent hardness material could be used for both the tubular body and the swirl vane cuff. In any event, the swirl vane cuff provides a turbulent airflow that can be directed to a turbocharger to increase engine performance. The disclosed assembly provides a construction that is overmolded directly to a polymer duct and creates a leak-proof chemical bond therebetween. Moreover, the assembly 20 closely positions the swirl vanes in close proximity to the connecting port. This is believed to provide improved performance for the turbocharger as previous swirl vanes were included in the tubular body away from the receiving port and not in the cuff area of the tubular body. Such a configuration is also advantageous in that it is an integrally formed part with the tubular body as opposed to prior art constructions which were mechanically assembled to the tubular body.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A swirl vane air duct cuff assembly comprising:
   a tubular body; and
   a swirl vane cuff extending from said tubular body,
   said swirl vane cuff over-molded to an end of said tubular body, said swirl vane cuff having an exterior surface which has a cuff groove, and an interior surface which has a plurality of vanes inwardly and integrally extending therefrom, each said vane having a base directly extending from said interior surface, and each said vane having a leading edge and a trailing edge opposite each other to form a contoured airflow surface that imparts a swirling motion to an airflow moving from said tubular body through said swirl vane cuff, wherein each said leading edge and each said trailing edge of an adjacent vane form a vane gap therebetween without overlapping one another when the assembly is viewed axially.

2. The assembly according to claim 1, wherein said swirl vane cuff has a cuff rim at one end and a cuff finger at an opposite end, wherein said cuff finger is bonded to said tubular body.

3. The assembly according to claim 2, wherein said leading edge is closer to said cuff finger than to said cuff rim.

4. The assembly according to claim 3, wherein said leading edge and said trailing edge are tapered and terminate at a tip.

5. The assembly according to claim 3, wherein each said base is at substantially a same axial position on said interior surface.

6. The assembly according to claim 2, wherein said swirl vane cuff has a cuff body, said cuff body comprising:
   a cuff rim angularly extending from said cuff body;
   a cuff ring angularly extending from said cuff body; and
   said cuff finger angularly extending from said cuff ring.

7. The assembly according to claim 6, wherein said swirl vane cuff further comprises:
   a collar extending from said swirl vane cuff to define said cuff groove between said collar and said cuff rim, and wherein said plurality of vanes are relatively positioned between said cuff ring and said collar.

8. The assembly according to claim 6, wherein said tubular body comprises
   a cuff end comprising:
   an annular shoulder angularly extending from said tubular body;
   an annular ring extending from said annular shoulder; and
   a lip inwardly extending from said annular ring.

9. The assembly according to claim 8, wherein said lip is adjacent and connected to said cuff ring.

10. The assembly according to claim 8, wherein said cuff end is internally received in said cuff ring.

11. The assembly according to claim 1, wherein said leading edge extends perpendicularly into the airflow.

12. The assembly according to claim 1, wherein said leading edge and said trailing edge terminate at a tip, and said tips collectively form an axial flow for the swirling motion of the airflow.

13. The assembly according to claim 1, wherein said tubular body is made from a polymeric material having a hardness value ranging from 70 Shore A to 130 Shore R, and said swirl vane cuff is made from a polymeric material softer than that used for said tubular body and has a hardness value ranging from 45 Shore A to 90 Shore A.

* * * * *